US012689612B2

(12) United States Patent (10) Patent No.: US 12,689,612 B2
Pierrepont (45) Date of Patent: Jul. 21, 2026

(54) USER DATAGRAM PROTOCOL FIREWALL

(71) Applicant: MICROSOFT TECHNOLOGY LICENSING, LLC, Redmond, WA (US)

(72) Inventor: Timothy James Pierrepont, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 102 days.

(21) Appl. No.: 18/522,057

(22) Filed: Nov. 28, 2023

(65) Prior Publication Data

US 2025/0112891 A1 Apr. 3, 2025

(30) Foreign Application Priority Data

Sep. 28, 2023 (GB) ...................................... 2314936

(51) Int. Cl.
*H04L 9/40* (2022.01)
*H04L 65/65* (2022.01)
(52) U.S. Cl.
CPC ...... *H04L 63/0236* (2013.01); *H04L 63/0272* (2013.01); *H04L 65/65* (2022.05)
(58) Field of Classification Search
CPC .... H04L 63/0236; H04L 65/65; H04L 63/029
See application file for complete search history.

(56) References Cited

U.S. PATENT DOCUMENTS

| | | | | |
|---|---|---|---|---|
| 8,244,810 | B1 * | 8/2012 | Haldar | .................... H04L 51/04 |
| | | | | 709/206 |
| 9,036,468 | B1 * | 5/2015 | Agarwal | ................. H04L 47/32 |
| | | | | 370/230 |
| 9,736,118 | B2 | 8/2017 | Li | |
| 11,411,986 | B2 * | 8/2022 | Dudouit | .............. H04L 63/0236 |
| 2005/0152341 | A1 * | 7/2005 | Curcio | .................... H04L 65/70 |
| | | | | 370/352 |
| 2009/0094691 | A1 * | 4/2009 | Dargis | ................ H04L 63/0272 |
| | | | | 726/11 |

(Continued)

FOREIGN PATENT DOCUMENTS

GB 2314936.2 9/2023

OTHER PUBLICATIONS

Bell, Abdullah, "What is Azure DDoS Protection?", Retrieved From: https://learn.microsoft.com/en-us/azure/ddos-protection/ddos-protection-overview, Aug. 24, 2023, 4 Pages.

(Continued)

*Primary Examiner* — Hieu T Hoang
(74) *Attorney, Agent, or Firm* — Han Gim; Newport IP, LLC

(57) ABSTRACT

In a UDP firewall, a flow of packets is received from a public communications network, the flow of packets being sent into a private communications network. The firewall forwards a threshold amount of the flow of packets into the private communications network and validates the flow of packets in response to receiving a packet from the private communications network. In response to the validation failing the firewall blocks the flow of packets. In response to the validation succeeding the firewall allows the flow of packets to continue to be forwarded into the private communications network.

20 Claims, 9 Drawing Sheets

(56) References Cited

U.S. PATENT DOCUMENTS

| | | | | |
|---|---|---|---|---|
| 2010/0235507 A1* | 9/2010 | Szeto | .................. | H04L 67/1001 709/225 |
| 2011/0082947 A1* | 4/2011 | Szeto | ................. | H04L 63/0218 709/232 |
| 2015/0026793 A1* | 1/2015 | Li | ....................... | H04L 63/1458 726/12 |
| 2019/0319923 A1* | 10/2019 | Tu | ....................... | H04L 63/0218 |
| 2020/0162507 A1* | 5/2020 | Dudouit | ............... | H04L 63/108 |
| 2020/0389487 A1* | 12/2020 | Zhauniarovich | .... | H04L 63/1491 |
| 2021/0006477 A1* | 1/2021 | Tan | ........................ | H04N 17/00 |
| 2023/0344770 A1* | 10/2023 | Kadam | .............. | H04L 12/4633 |
| 2023/0362191 A1* | 11/2023 | Mereddy | ................. | H04L 47/83 |
| 2024/0031290 A1* | 1/2024 | Lin | ....................... | H04L 47/125 |

OTHER PUBLICATIONS

Jordan, Matt, "RTP Security Vulnerabilities: A Retrospective", Retrieved From: https://www.asterisk.org/rtp-security-vulnerabilities/, Sep. 27, 2017, 11 Pages.
Wright, Tom, "3 UK VoIP Providers Hit by DDOS Attacks", Retrieved From: https://www.uctoday.com/unified-communications/3-uk-voip-providers-hit-by-ddos-attacks/, Sep. 6, 2021, 7 Pages.
International Search Report Received in PCT Application No. PCT/US2024/046291, mailed on Dec. 10, 2024, 14 pages.
International Preliminary Report on Patentability (Chapter I) Received in PCT Application No. PCT/US2024/046291, mailed on Apr. 9, 2026, 08 Pages.

* cited by examiner

USER DATAGRAM PROTOCOL FIREWALL

CROSS-REFERENCE TO RELATED APPLICATION(S)

This non-provisional utility application claims priority to UK patent application number 2314936.2 entitled "USER DATAGRAM PROTOCOL FIREWALL" and filed on 28 Sep. 2023, which is incorporated herein in its entirety by reference.

BACKGROUND

Where user datagram protocol (UDP) based services such as voice over internet protocol VoIP services are deployed using data centers and cloud computing technologies, denial of service attacks are an ongoing problem. Denial of service attacks occur where a malicious party floods a communications network resource with requests. Because of the flood of requests one or more of the communications network resources become overloaded and are unable to deal with legitimate requests.

Distributed denial of service attacks occur where the malicious party causes the flood of requests to originate, or appear to originate, from many different sources. This type of attack is hard to deal with since each individual source may be sending a non-suspicious volume of traffic. Distributed denial service attacks are a particular problem for UDP due to the light-weight, connectionless nature of the protocol. This mean there is no need to establish a connection before sending traffic, and so no opportunity to screen senders prior to them sending.

The embodiments described below are not limited to implementations which solve any or all of the disadvantages of known ways of mitigating denial of service attacks.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a way of blocking denial of service flows that does not require prior knowledge of permitted users, usually stored in a core of the communications network such as user credentials. The method is lightweight, scalable and deployable at the edge of a VoIP communications network, such as but not limited to a fifth generation 5G communications network, using a user datagram protocol UDP firewall.

In various examples there is a method performed by a UDP firewall. A flow of packets is received from a public communications network, the flow of packets being sent into a private communications network. The firewall forwards a threshold amount of the flow of packets into the private communications network and validates the flow of packets in response to receiving a packet in the reverse direction on the same flow. In response to the validation failing the firewall blocks the flow of packets. In response to the validation succeeding the firewall allows the flow of packets to continue to be forwarded into the private communications network.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
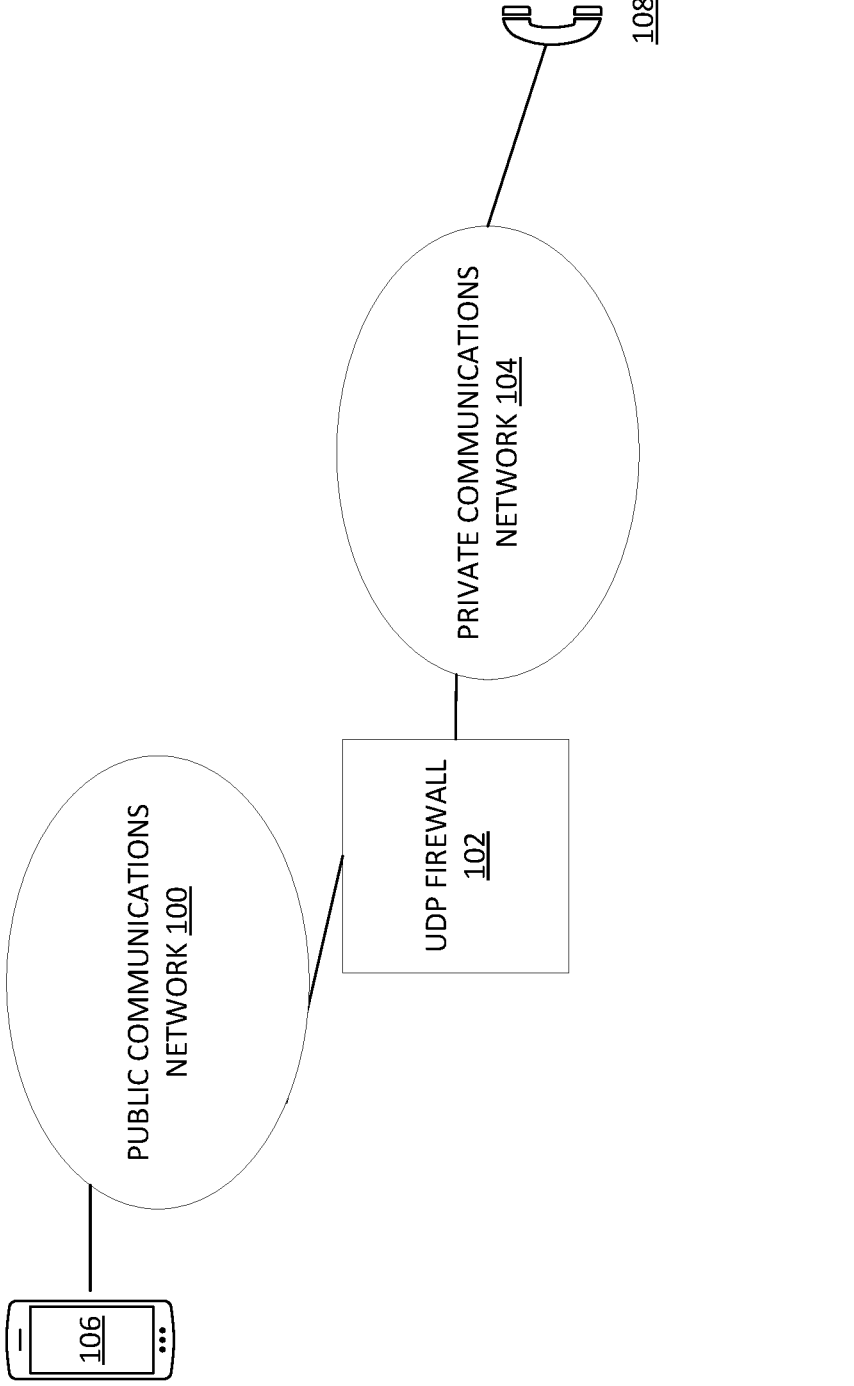
FIG. 1 is a schematic diagram of a UDP firewall connected between a public communications network and a private communications network.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

A denial of service (DOS) attack succeeds by utilizing a target's resources, such that the target can't perform useful work. More sophisticated sorting costs more resources and so simpler algorithms are preferred.

Private UDP networks, such as used for VoIP communications networks which are connected to public communications networks are vulnerable to DOS attacks from malicious parties in the public communications network. Some approaches for enabling such a private communications network to defend against DOS attacks are difficult to scale because they involve using heavyweight, stateful equipment in the private communications network, such as session border controllers or other stateful security devices. Decisions made by session border controllers about what (ostensible) real time transport protocol (RTP) flows, or other UDP flows, to permit and what to drop are complex, and involve reference to session description protocol (SDP), and to policy, and deep protocol knowledge. Deep protocol knowledge is detailed information about a communications protocol. However, scalability of DoS defences is key to mitigating DoS attacks since DOS attacks are unexpected and rapidly escalate from relatively low amounts of attack traffic to huge amounts aiming to overwhelm an attack target.

One approach is to separate out the DoS defence functionality of a session border controller or other heavyweight, stateful communications network node, into a separate node which is lighter weight. The separate node would still need to inspect the SDP though, and know what the policies are, and have all the other cleverness of the SBC. If it had anything less, it would be preventing the SBC from applying its logic by making decisions the SBC might not make. Thus the inventor recognizes that splitting out the DoS defence function into a separate node doesn't really help because the separate node is still have a heavyweight, stateful device.

Another approach is to consider using a network address translator (NAT). However, the inventor has recognized that SBCs can't be deployed behind NATs in an efficient manner. Doing so involves complexity such as pre-configured pinholes and SDP manipulation. NATs translate internet protocol (IP) information in packets, and being able to observe the unchanged IP information is key to SBC function.

The present technology uses a method performed by a UDP firewall. A flow of packets is received from a public communications network, the flow of packets being sent into a private communications network. The flow may be legitimate or may be from a malicious party. The firewall forwards a threshold amount of the flow of packets into the private communications network and validates the flow of packets in response to receiving a packet in the reverse direction on the same flow. The packet received in the reverse direction can be any packet on the same flow and does not have to be a special type of packet. In response to the validation failing (such as if no packet in the reverse direction is received within the threshold) the firewall blocks the flow of packets, so mitigating a potential DOS attack. In response to the validation succeeding the firewall allows the flow of packets to continue to be forwarded into the private communications network thus enabling legitimate flows to go ahead. Once validated it is possible for the flow to stay validated until it ceases. The UDP firewall itself is stateless since it does not use information about a sender of the flow (such as user credentials) that has to be obtained from another source in the core of the private communications network. The UDP firewall is stateless as it does not need to store data except for information about flows which have been validated. The UDP firewall is lightweight and efficient since the validation is straightforward, involving receiving a packet from the private communications network. Because the UDP firewall is lightweight and can operate independently it is scalable.

FIG. 1 is a schematic diagram of a UDP firewall 102 connected between a public communications network 100 such as the internet or any other publicly accessible communications network and a private communications network 104. The private communications network is a private 5G communications network in some examples but is not limited to that and can be any private communications network suitable for communicating UDP flows. A flow is a streams of packets between a first communications network node and a second communications network node. A flow is defined by a five-tuple comprising: source internet protocol address, source port, destination internet protocol address, destination port, transport. A flow may be unidirectional or bidirectional. A UDP flow is a flow of UDP packets. In an example a flow from smart phone 106 traverses the public communications network 100 and has to pass through UDP firewall 102 in order to reach the private communications network 104 and a destination endpoint such as VOIP phone 108 in the private communications network. The flow may be bidirectional such as to enable a VoIP call between smart phone 106 and VoIP phone 108.

Since the private communications network 104 is connected to the public communications network 100 it is vulnerable to DOS attacks from nodes in the public communications network 100. UDP firewall 102 is interposed between the public communications network 100 and the private communications network 104 in order to mitigate DOS attacks. UDP firewall 102 is able to block a flow into the private communications network 104 where the flow is suspected as being part of a DOS attack. The UDP firewall 102 is substantially stateless in that it stores data about flows which have been validated as legitimate and does not store or use other stored data such as user credentials, user passwords or other data.

Alternatively, or in addition, the functionality of the UDP firewall described herein is performed, at least in part, by one or more hardware logic components. For example, and without limitation, illustrative types of hardware logic components that are optionally used include, hardware packet processor, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUS).

Figure 2:
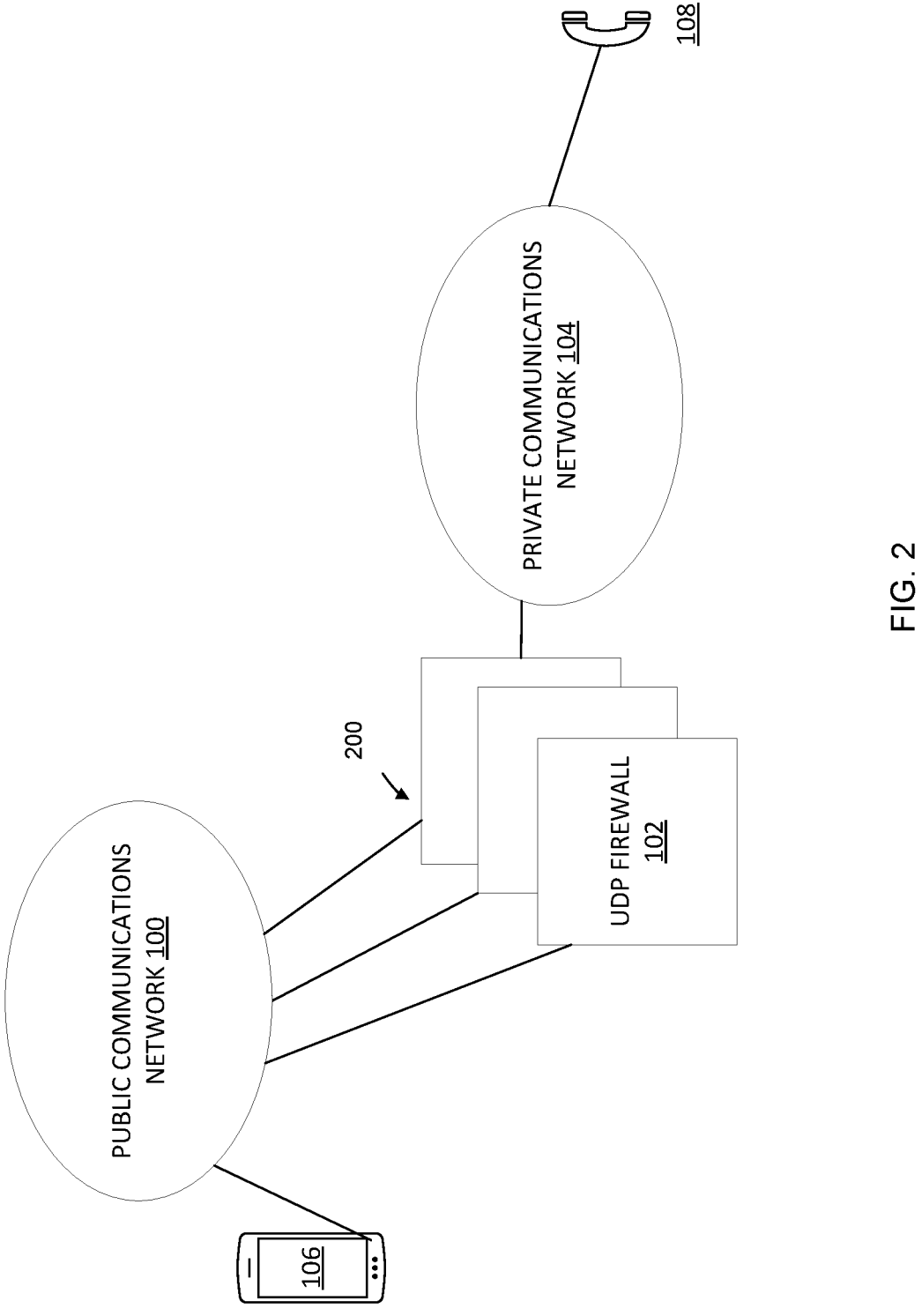
FIG. 2 is a schematic diagram of a plurality of UDP firewalls deployed between a public and a private communications network.

FIG. 2 is a schematic diagram of a plurality of UDP firewalls 200 deployed between a public 100 and a private communications network 104. A comparison of FIG. 1 and FIG. 2 illustrates how it is possible to scale the UDP firewall 102 of FIG. 1 by instantiating more UDP firewalls and deploying them between the public and private communications networks. Because the UDP firewall 102 is substantially stateless it is efficient to scale by making copies of it. The UDP firewall may be configured so that in response to receiving more than a threshold number of flows in a given time period, the UDP firewall triggers instantiation of another firewall. The triggering comprises sending an instruction to another node of the private communications network causing it to allocate a virtual machine or process for deploying a UDP firewall.

Figure 3:
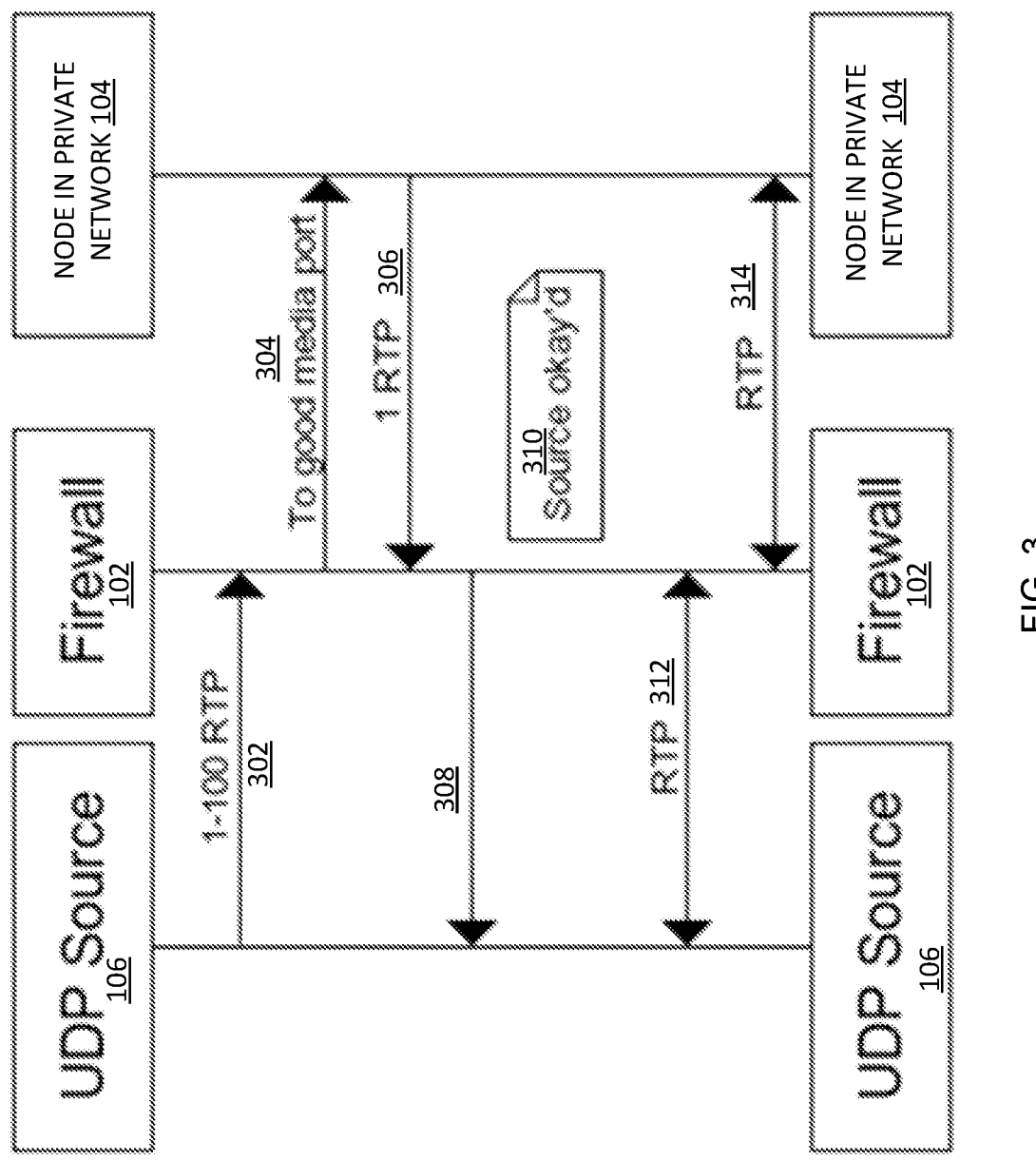
FIG. 3 is a message sequence chart in the case of no denial of service for a flow originating in a public communications network.

FIG. 3 is a message sequence chart in the case of no denial of service (i.e. a legitimate flow) for a flow originating in a public communications network. FIG. 3 shows a UDP source 106 as a vertical line. The UDP source 106 is in a public communications network such as that of FIGS. 1 and 2. FIG. 3 shows a firewall 102 which is a UDP firewall such as that of FIGS. 1 and 2. FIG. 3 shows a node in a private network 104 such as that of FIGS. 1 and 2. Arrows between the vertical lines in FIG. 3 represent messages and the relative vertical position of the arrows represents chronological order.

The UDP firewall 102 receives a flow of packets from the UDP source 106 in the public communications network. The flow of packets is being sent into a private communications network such as to node 104 in the private communications network. In the example of FIG. 3 the flow of packets comprises RTP packets although this is not essential as any UDP packets may form the flow, such as simple traversal underneath network address translator STUN packets, real-time transport control protocol RTCP packets, or session initiation protocol SIP packets.

The UDP firewall 102 forwards only a threshold amount of the flow of packets into the private communications network. For example, the UDP firewall 102 forwards packets 1 to 100 of the RTP packets to the node in the private network 104 where the threshold amount is 100 packets. Note that other values of the threshold are used in some cases. The packets 1 to 100 are forwarded as indicated by arrow 304 in FIG. 3 such as to a good media port of the node in the private network 104 or any other suitable port of the node in the private network 104. A good media port is a port of the node on which traffic is expected. In the case of RTP, a good port is one which has been opened up, because a call has been set up and this port was allocated to it. The port is now expecting media to arrive on it.

The node in the private network sends 306 a packet back to the UDP firewall 102 in the case of a bidirectional flow (such as a VoIP call involving two parties speaking together). In the example of FIG. 3 the packet which is sent in operation 306 is an RTP packet but that is not essential; any UDP packet is usable.

The UDP firewall 102 receives the packet sent in operation 306 and in response validates the flow of packets between UDP source 106 and the node in the private network 104. FIG. 3 shows "source okay'd" at operation 310 whereby the UDP firewall 102 validates the UDP source 106 of the flow as a result of receiving the packet in operation 306 from the node in the private network 104.

The UDP firewall 106 forwards the packet it received from the private network 104 to the UDP source in the public network at operation 308.

The flow now becomes bidirectional 312, 314 thus enabling bidirectional communication (such as a video or voice call) between the UDP source 106 in the public communications network and the node in the private communications network 104.

The UDP firewall is thus able to enable legitimate flows to pass through itself in an efficient manner. The UDP firewall achieves this without having to look up data from a core of the public or private communications network.

In the example of FIG. 3, the UDP firewall validates the flow of packets in response to receiving 306 a packet from the private communications network as part of the flow, the flow being bidirectional.

In any of the examples described herein, the threshold amount is a number of packets received during a length of time taken to establish a voice over internet protocol, VoIP, call between a node in the private communications network of the communications network and a node in the public communications network of the communications network. Having a threshold amount configured in this way gives the benefit that legitimate calls can be established whilst potential DoS flows are blocked. In some cases the threshold amount is about one hundred packets which is found to give good working results in practice. The threshold amount is a number of packets expected to be received during a length of time taken to establish a fifth generation 5G voice over internet protocol, VoIP, call between a node in the private communications network of the communications network and a node in the public communications network of the communications network. By relying on known properties of the protocol using UDP as a transport, filtering of unexpected traffic can be achieved. For example, the nature of RTP is that fifty to one hundred packets per-second can typically be expected in each direction. Thus, anything sending more than that, or any flow which never sends traffic in both directions, is suspect.

In any of the examples described herein the UDP firewall is able to dynamically adjust the threshold according to a number of flows that have been blocked by the firewall. This gives a benefit of effective DoS mitigation since where a frequency or volume of malicious flows is increasing the threshold is reduced so that an amount of traffic reaching the private network resources is reduced.

Figure 4:
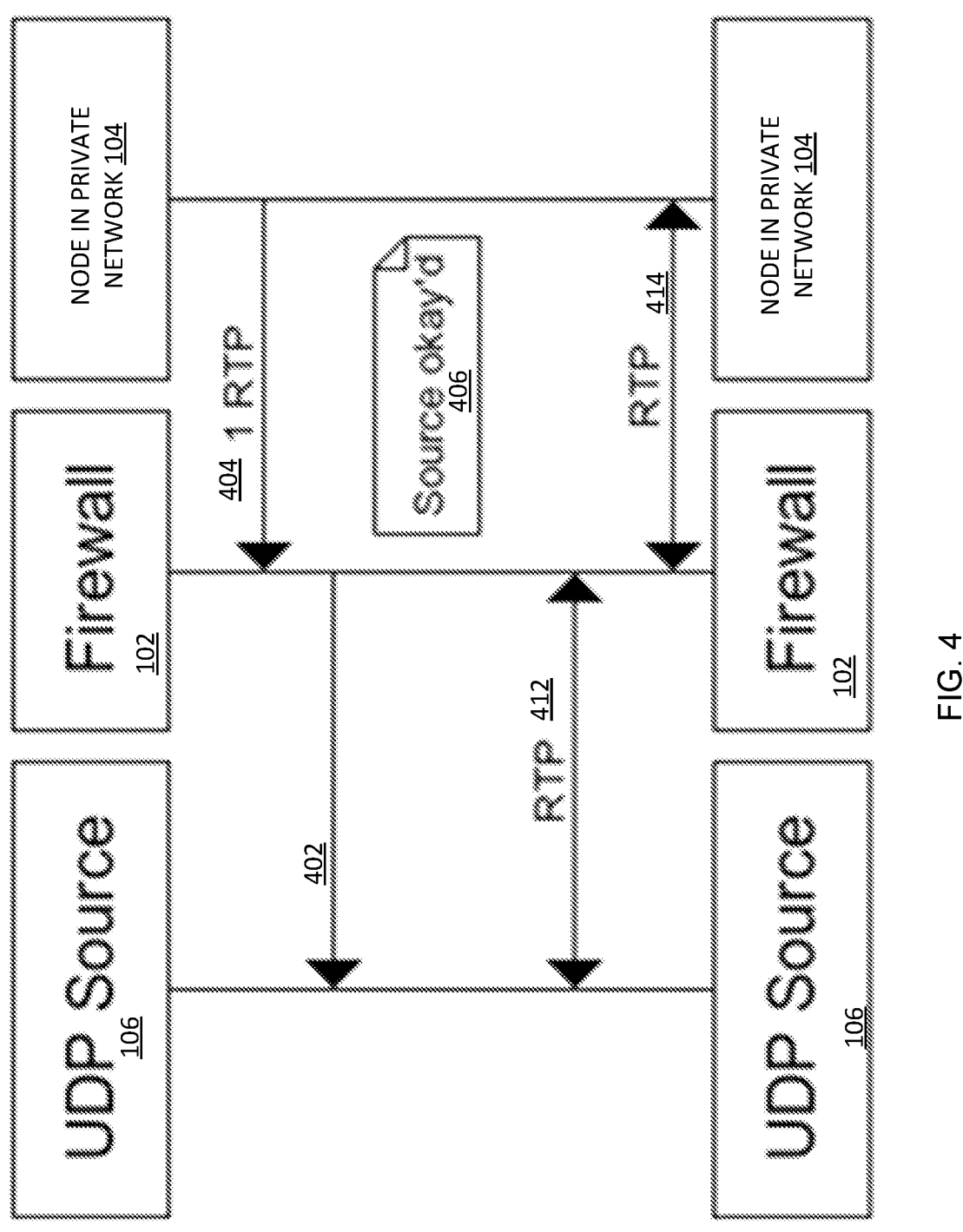
FIG. 4 is a message sequence chart in the case of no denial of service for a flow originating in a private communications network.

FIG. 4 is a message sequence chart in the case of no denial of service for a flow originating in a private communications network. A node in the private communications network 104 (such as the private communications network of FIG. 1 or 2) sends a packet 404 to the UDP firewall. The packet may be an RTP packet or any other UDP packet. The firewall receives the packet and has a rule whereby it is able to forward any packet from the private communications network into the public communications network. Thus traffic from the private communications network 104 is assumed to always be legitimate. The UDP firewall forwards 402 the packet to the UDP source 106 in the public communications network. The UDP firewall keeps a record of the UDP source 106 as being validated (this is illustrated in box 406 in FIG. 4 "source okay'd"). A bidirectional flow between the UDP source 106 and the node in the private network 104 is then achieved via the UDP firewall and indicated in FIG. 4 by double headed arrows 412 and 414. When packets from the UDP source 106 reach the UDP firewall, the UDP firewall is able to check the UDP source 106 is a validated source by looking in the record. Since the UDP source 106 is in the record the packets from the UDP source 106 are passed through the UDP firewall into the private communications network.

In the example of FIG. 4 the UDP firewall is replaced in some cases by another UDP firewall. This happens during scaling (as discussed with reference to FIG. 2) and/or when a UDP firewall is replaced due to maintenance or for other reasons such as load balancing. Because the UDP firewall is stateless, when traffic goes to a new instance of the UDP firewall, the new instance of the UDP firewall starts the process of any of FIGS. 3 to 8 afresh. Thus it is possible to scale (as in FIG. 2) without any complicated procedures. It is also is possible to deal with nodes of the communications network that fail by replacing them with new instances.

Figure 5:
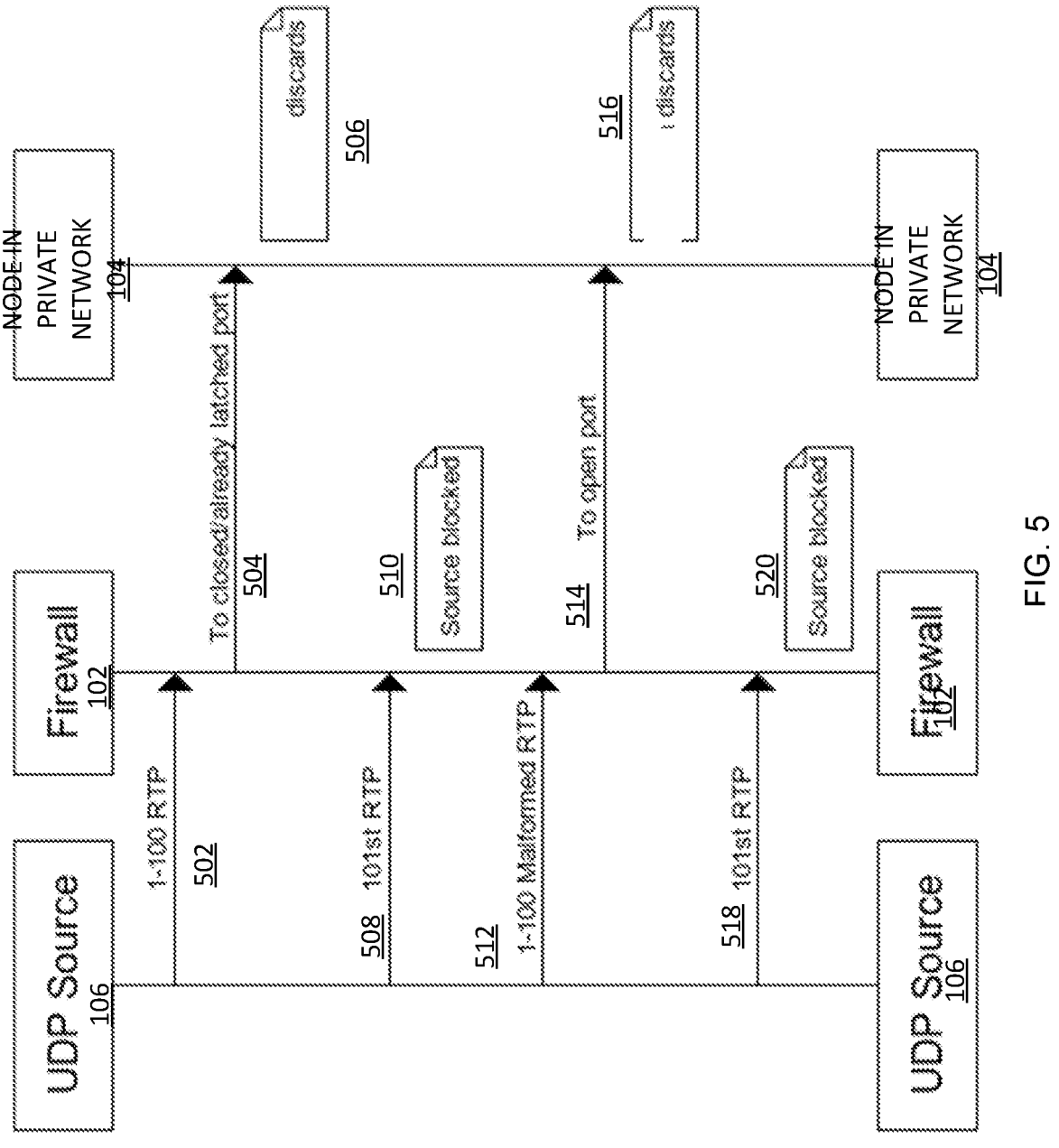
FIG. 5 is a message sequence chart in the case of potential denial of service attacks.

FIG. 5 is a message sequence chart in the case of potential denial of service attacks. A threshold amount of a flow of packets is sent 502 from a UDP source 106 in a public communications network to a node in a private communications network 104. In this example the threshold is 100 packets although other values of the threshold are used in some examples. A UDP firewall 102 receives the threshold amount of the flow of packets and forwards them to the node in the private communications network 104. The threshold amount of the flow of packets may be forwarded 504 to a closed or already latched port of the node in the private communications network 104. An already latched port is a port that is already in use by another flow. The node in the private communications network 104 has denial of service defense functionality such that it discards 506 the threshold amount of the flow of packets. The denial of service defense functionality comprises rules or criteria whereby in response to a flow being sent to a closed port or to an already latched port of the node, it is assumed to be malicious and is discarded. Since the threshold amount of the flow of packets is discarded 506 the UDP firewall 102 does not receive any packet from the private communications network. Therefore the UDP firewall 102 fails validation of the flow of packets from the UDP source. In response to the validation failing, the UDP firewall 102 blocks the flow of packets from the UDP source 106. In this way denial of service is mitigated since the flow of packets from the UDP source is blocked. The denial of service mitigation is achieved by the UDP firewall without the UDP firewall having to use credentials or user data associated with the UDP source. The denial of service mitigate is achieved in a substantially stateless manner. The node in the private communications network 104 has denial of service defense functionality which does not need to be replicated or included at the UDP firewall thus making the UDP firewall light weight and scalable. The UDP firewall is completely agnostic to the logic used by the denial of service functionality in the node in the private communications network. The UDP firewall receives information from the node in the private network telling the UDP firewall to let a flow through. The UDP firewall does not care why the node in the private network made that decision. Anything type of private network node is able to sit behind the UDP firewall, as long as the private network node has a way of making decisions to allow flows to pass through the UDP firewall or not, and as long as the private network node's method of dealing with things it doesn't like is to ignore them (rather than send a rejection back).

Similarly, the protected application (on the node in the private network) doesn't need to know about the firewall. It just sees a normal stream of packets. The only difference from its point of view is that it never needs to ignore more than 100 from any one source, because they mysteriously stop at that threshold.

Subsequently, a packet is sent 508 from the UDP source 106 in the public communications network to the UDP firewall. Since a threshold amount of packets has already been sent (see 502 in FIG. 5) from the UDP source the packet exceeds the threshold. The UDP firewall detects that the threshold has been exceeded and blocks 510 the flow from the UDP source 106 as indicated by "source blocked 510" in FIG. 5. In this way DoS is mitigated since the UDP source is potentially malicious and flows from it are blocked.

In another case the UDP source 106 sends a threshold amount of another flow 512, from a different port on the UDP source (which is not blocked by the UDP firewall), to the UDP firewall 102. In this example the threshold amount is 100 packets although other threshold amounts may be used. The packets are malformed RTP. The UDP firewall forwards 514 the malformed RTP to an open port of the node in the private communications network 104, since the threshold is not yet exceeded. The node in the private communications network 104 discards 516 the threshold amount of the flow because it detects the flow comprises malformed RTP. The node in the private communications network 104 has DoS mitigation functionality comprising rules or criteria to detect and discard packets which are malformed. A malformed packet is a packet which has a format and/or contents which do not conform to a communications protocol.

Since the threshold amount of the flow of packets is discarded 516 the UDP firewall 102 does not receive any packet from the private communications network. Therefore the UDP firewall 102 fails validation of the flow of packets from the UDP source 106. In response to the validation failing, the UDP firewall 102 blocks 520 the flow of packets from the UDP source 106. A packet received 518 from the UDP source 106 that exceeds the threshold amount is blocked by the UDP firewall 102. In this way denial of service is mitigated since the flow of packets from the UDP source 106 is blocked.

The UDP firewall of the disclosure operates in an unconventional manner to achieve the scalable denial of service attack mitigation functionality of the disclosure.

Figure 6:
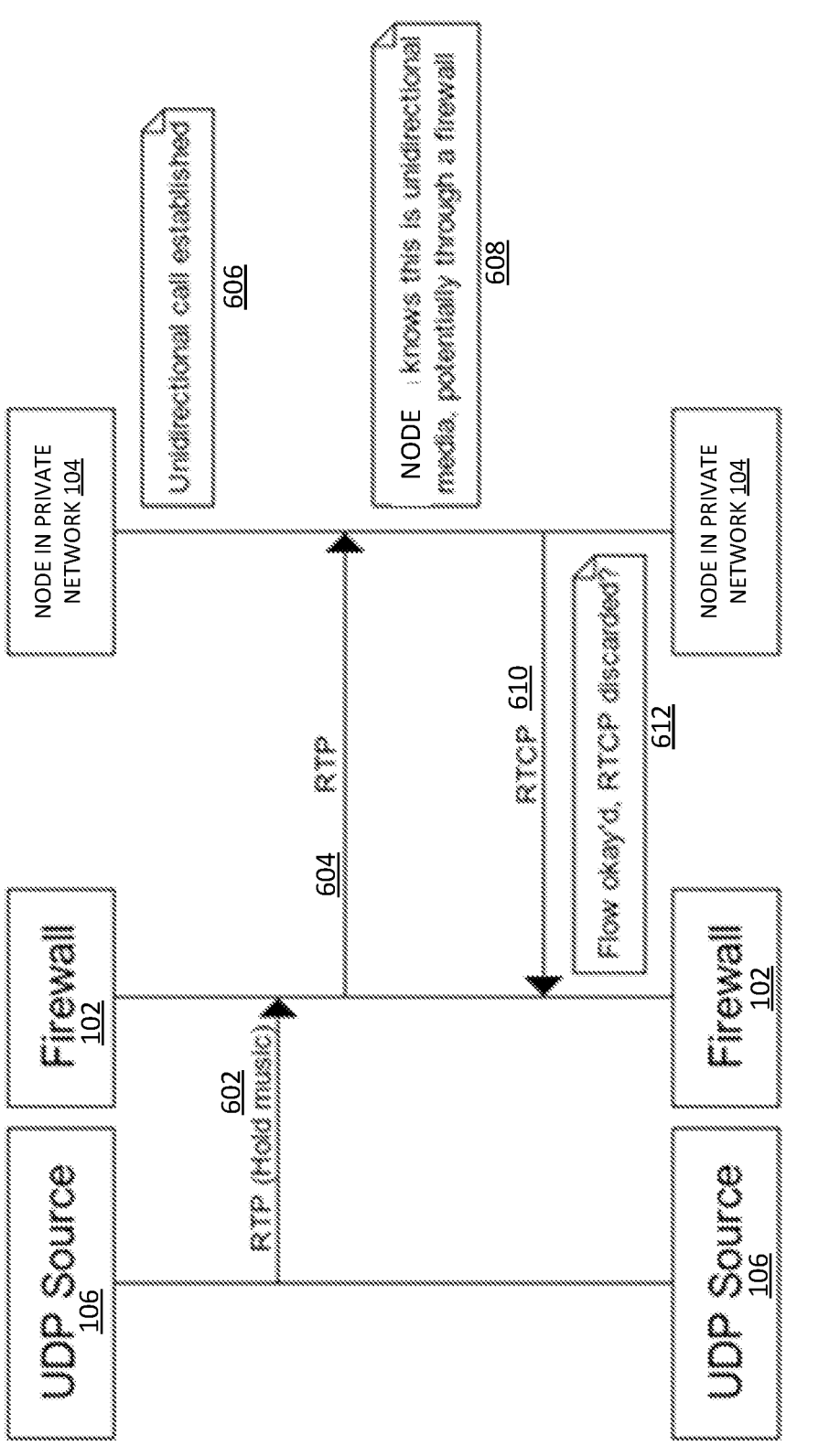
FIG. 6 is a message sequence chart in the case of a legitimate flow which is unidirectional.

By forwarding only a threshold number of packets into the private communications network it is possible to limit the scope for DDoS attacks to affect the private network. By deriving information by observing what the protected application does, the UDP firewall is substantially stateless and is therefore scalable. FIG. 6 is a message sequence chart in the case of a legitimate flow which is unidirectional. A unidirectional call is established 606 between a UDP source 106 in a public communications network and a node in a private communications network 104 via a UDP firewall 102. The deployment is as illustrated in FIGS. 1 and 2 in some cases. The unidirectional call comprises a flow 602 from UDP source to UDP firewall and where that flow is forwarded 604 from the UDP firewall to the node in the private communications network 104.

In the case that uni-directional flows are to occur in typically bi-directional protocols, a protected application is aware of the UDP firewall and sends at least one packet in the reverse direction (i.e. towards the public network). For example the node in the private communications network 104 knows 608 the flow is unidirectional and is potentially passing through a UDP firewall 102. Therefore the node in the private communications network sends a real-time transport control protocol (RTCP) packet 610 to the UDP firewall 102. The UDP firewall therefore validates the flow (602, 604) from the UDP source 106 because it has received a packet from the node in the private communications network 104. The UDP firewall 102 therefore validates the flow and optionally discards the RTCP packet.

In some cases an RTCP packet is sent periodically on a flow where media is expected to be unidirectional. Thus the UDP firewall receives period RTCP packets on a flow where media is expected to be unidirectional, the period RTCP packets being received from a node in the private communications network 104. This provides a way for legitimate unidirectional traffic to pass through the UDP firewall from the public communications network into the private communications network. In some cases the periodic RTCP packets are received at the same RTP port of the firewall as the flow where media is expected to be unidirectional. This makes efficient use of ports and is achieved by multiplexing the periodic RTCP packets with the flow. In some cases the method comprises receiving the periodic RTCP packets at port N of the firewall and, in response, validating a flow on port N+1 of the firewall so that it is not necessary to multiplex the period RTCP packets with the flow. In this case the UDP firewall is optionally able to receive one of the periodic RTCP packets, inspect a payload of the received RTCP packet and in response to the payload being a specific payload, drop the received RTCP packet. This improves efficiency since the RTCP packet is dropped.

In the example of FIG. 6 the UDP firewall validates the flow of packets in response to receiving a packet from the private communications network (e.g. RTCP 610) independently of the flow.

Figure 7:
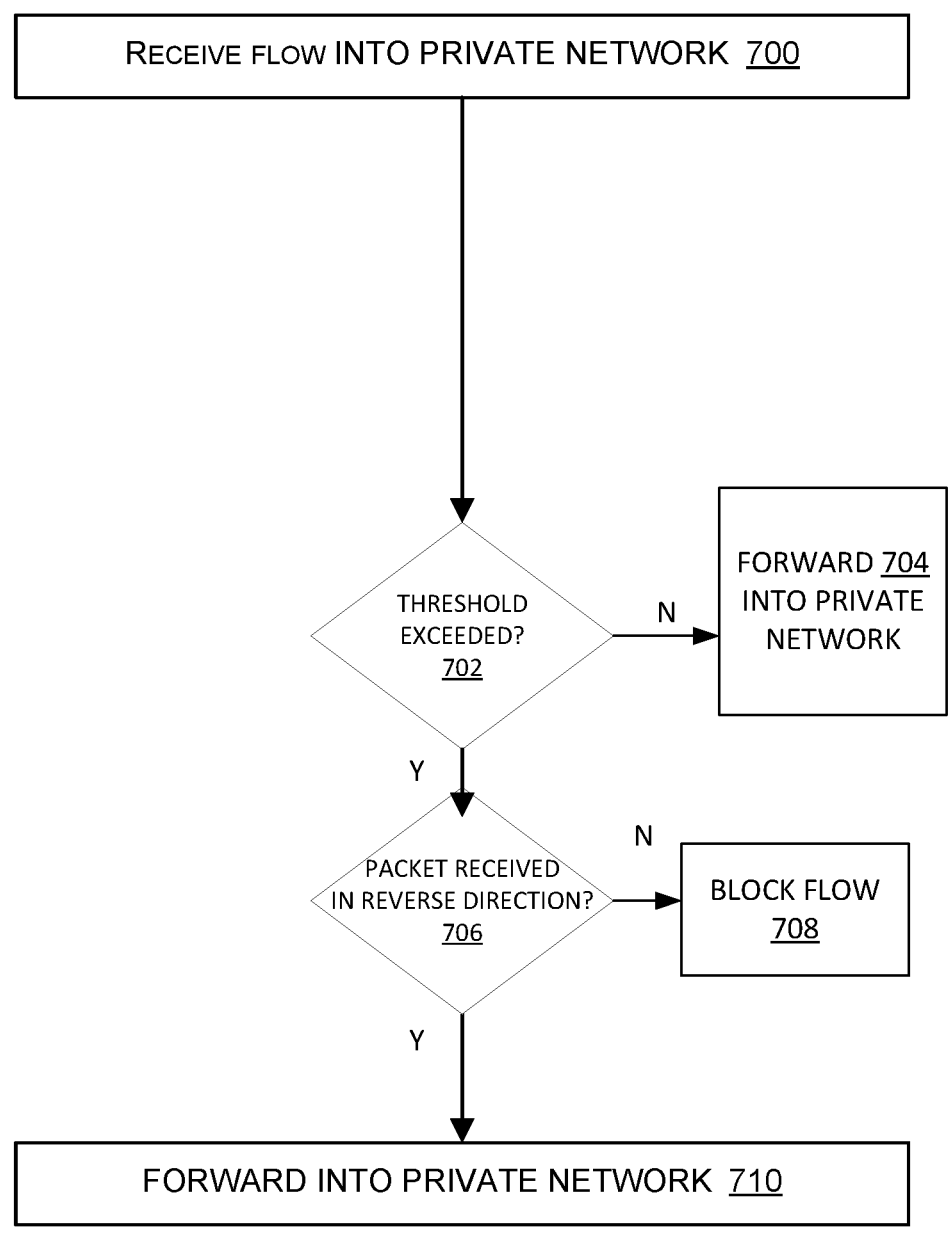
FIG. 7 is a flow diagram of a method performed by a UDP firewall.

FIG. 7 is a flow diagram of a method performed by a UDP firewall. A flow is received at the UDP firewall from a source in a public communications network. The UDP firewall checks 702 whether a threshold has been exceeded by checking whether an amount of packets of the flow that have already been forwarded into a private communications network meets the threshold. If the threshold is not exceeded at check 702 the flow is forwarded 704 into the private communications network.

If the threshold has been met or exceeded a check 706 is made as to whether a packet has been received from the private network. If a packet has been received from the private network, the flow is forwarded into the private network as the flow is considered to be validated. If a packet has not been received from the private network the flow is blocked 708 thus mitigating potential DOS attack.

Figure 8:
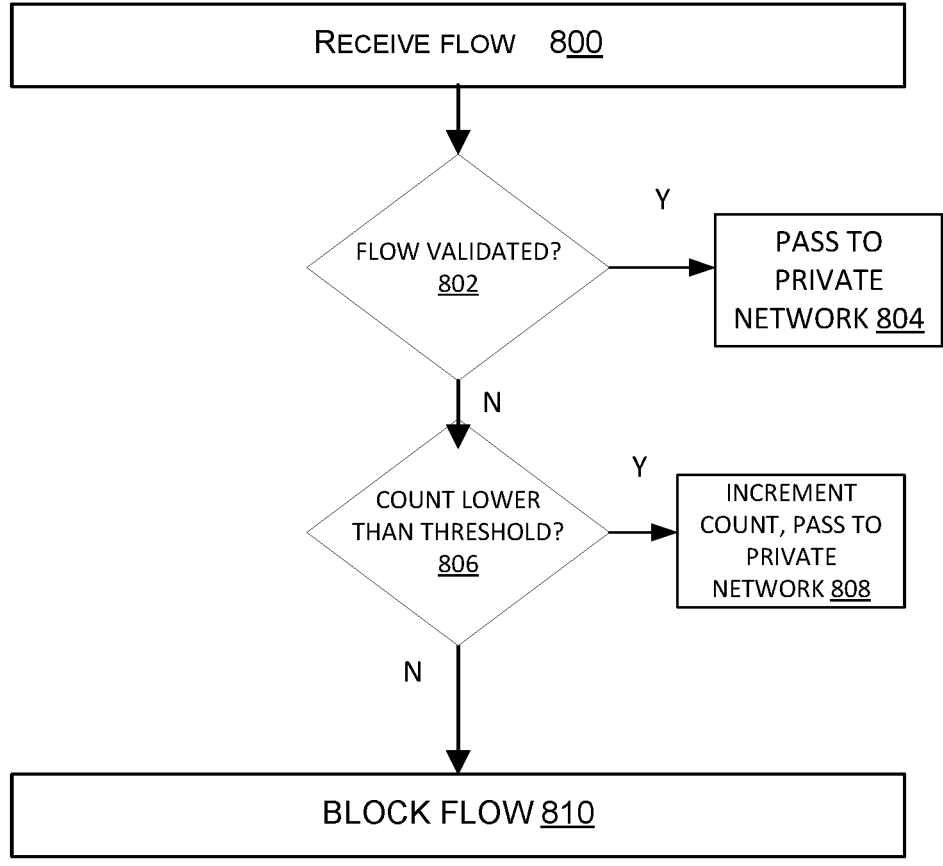
FIG. 8 is a flow diagram of another method performed by a UDP firewall.

FIG. 8 is a flow diagram of another method performed by a UDP firewall. A flow of UDP packets is received 800 at a UDP firewall from a UDP source in a public communications network. A check 802 is made as to whether the flow is validated. The check comprises looking in a record of flows that have been validated and if the currently received flow 800 is present in the record, the flow is passed 804 into the private network.

If the currently received flow is not present in the record a second check 806 is made. The second check comprises checking whether a value of a count is lower than a threshold. If so, the count is incremented and the flow is passed 808 to the private network as the flow is considered to be validated. If the value of the count meets or exceeds the threshold the flow is blocked 810.

In some cases the method of FIG. 8 comprises tracking source internet protocol addresses of flows which have had multiple ports banned and blocking flows from these source internet protocol addresses. This enables malicious parties who change the port but not the UDP source to be thwarted.

In some cases, the check at operation 806 comprises monitoring a time taken for the threshold to be met and in response to the threshold being exceeded within a specified time, blocking the flow. This helps with mitigating DOS attacks which tend to escalate quickly.

In the methods of FIGS. 7 and 8 there is an optional operation, comprising, in response to a specified time elapsing after blocking a flow, unblocking the flow. This enables UDP sources which become legitimate after previously being suspected as malicious, to be reconsidered. Similarly, a validated flow is delisted as validated a threshold period after the flow stops. Thus the methods of FIGS. 7 and 8 reset if no packets are flowing.

Figure 9:
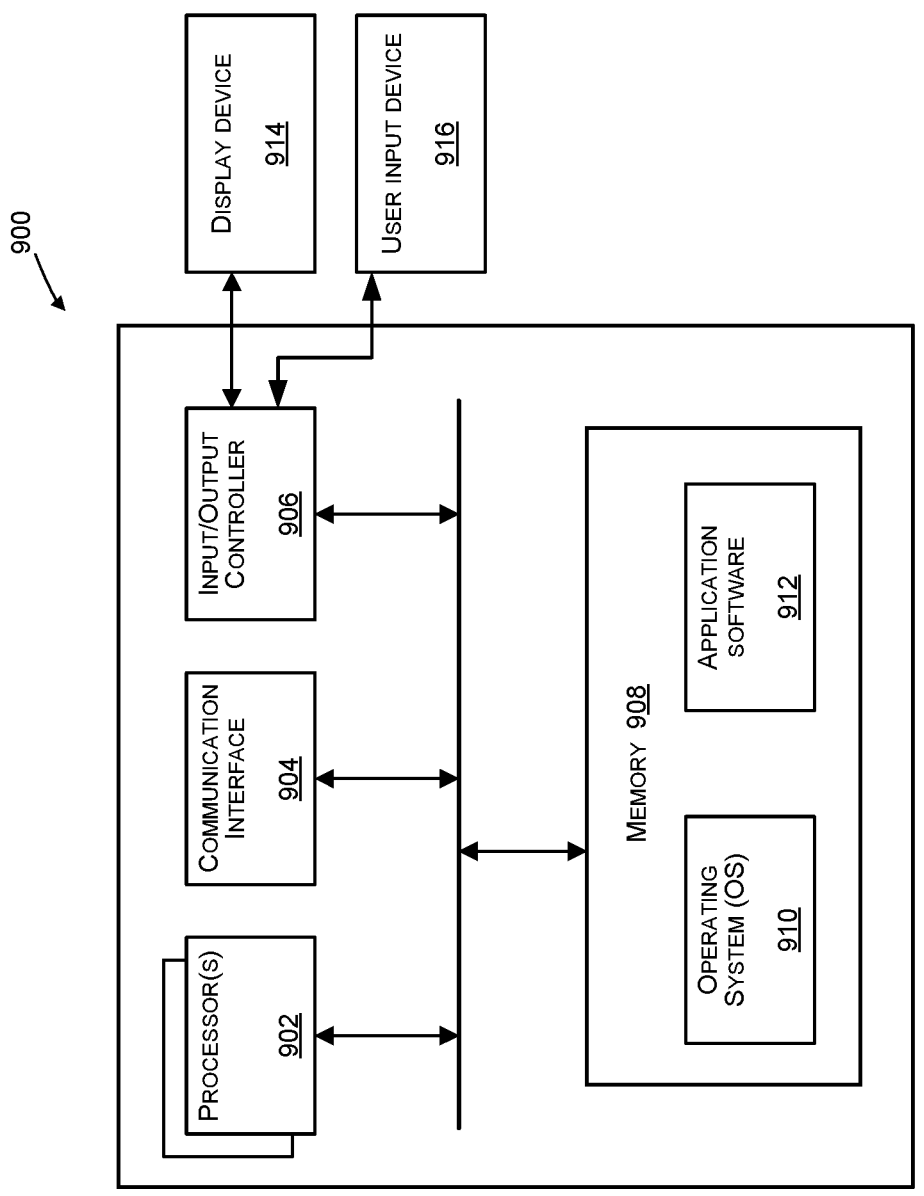
FIG. 9 illustrates an exemplary computing-based device in which examples of a UDP firewall are implemented.

FIG. 9 illustrates an exemplary computing-based device 900 in which examples of a UDP firewall are implemented in some cases. Computing-based device 900 is a node of a UDP communications network and in some cases is an edge node of a 5G communications network.

Computing-based device 900 comprises one or more processors 902 which are microprocessors, controllers or any other suitable type of processors for processing computer executable instructions to control the operation of the device in order to mitigate DOS attacks on a private communications network. In some examples, for example where a system on a chip architecture is used, the processors 902 include one or more fixed function blocks (also referred to as accelerators) which implement a part of the method of any of FIGS. 3 to 8 in hardware (rather than software or firmware). Platform software comprising an operating system 910 or any other suitable platform software is provided at the computing-based device to enable application software 912 to be executed on the device.

The computer executable instructions are provided using any computer-readable media that is accessible by computing based device 900. Computer-readable media includes, for example, computer storage media such as memory 908 and communications media. Computer storage media, such as memory 908, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 908) is shown within the computing-based device 900 it will be appreciated that the storage is, in some examples, distributed or located remotely and accessed via a network or other communication link (e.g. using communication interface 904). The computing-based device is connected to other nodes of a communications network via communication interface 904.

The computing-based device 900 also comprises an input/output controller 906 arranged to output display information to an optional display device 901 which may be separate from or integral to the computing-based device 900. The display information may provide a graphical user interface. The input/output controller 906 is also arranged to receive and process input from one or more devices, such as a user input device 916 (e.g. a mouse, keyboard, camera, microphone or other sensor).

Alternatively or in addition to the other examples described herein, examples include any combination of the following clauses.

Clause A. A method performed by a User Datagram Protocol, UDP, firewall comprising:

receiving a flow of packets from a public communications network, the flow of packets being sent into a private communications network;

forwarding only a threshold amount of the flow of packets into the private communications network;

validating the flow of packets in response to receiving a packet in a reverse direction on the same flow;

in response to the validation failing; block the flow of packets;

in response to the validation succeeding allowing the flow of packets to continue to be forwarded into the private communications network.

Clause B. The method of clause A wherein a lack of any packet being received in the reverse direction on the same flow is taken as validation failing.

Clause C. The method of any preceding clause wherein the reverse direction is from the private communications network towards the public communications network.

Clause D. The method of any preceding clause wherein the threshold amount is a number of packets received during a length of time taken to establish a voice over internet protocol, VoIP, call between a node in the private communications network of the communications network and a node in the public communications network of the communications network.

Clause E. The method of clause D wherein the threshold amount is about one hundred packets.

Clause F. The method of any preceding clause wherein the threshold amount is a number of packets expected to be received during a length of time taken to establish a fifth generation 5G voice over internet protocol, VoIP, call between a node in the private communications network of the communications network and a node in the public communications network of the communications network.

Clause G. The method of any preceding clause comprising, forwarding the threshold amount to a node in the private communications network, the node having denial of service defense functionality.

Clause H. The method of any preceding clause comprising dynamically adjusting the threshold according to a number of flows that have been blocked by the firewall.

Clause I. The method of any preceding clause comprising receiving periodic RTCP packets on a flow where media is expected to be unidirectional, the periodic RTCP packets being received from a node in the private communications network.

Clause J. The method of clause I wherein the periodic RTCP packets are received at the same RTP port of the firewall as the flow where media is expected to be unidirectional; or where the method comprises receiving the periodic RTCP packets at port N of the firewall and, in response, validating a flow on port N+1 of the firewall.

Clause K. The method of clause I comprising receiving one of the periodic RTCP packets, inspecting a payload of the received RTCP packet and in response to the payload being a specific payload, dropping the received RTCP packet.

Clause L. The method of any preceding clause wherein the firewall is stateless.

Clause M. The method of any preceding clause comprising, in response to receiving more than a threshold number of flows in a given time period, triggering instantiation of another firewall.

Clause N. The method of any preceding clause comprising tracking source internet protocol addresses of flows which have had multiple ports banned and blocking flows from these source internet protocol addresses.

Clause O. The method of any preceding clause comprising, in response to the threshold amount being exceeded within a specified time, blocking the flow.

Clause P. The method of any preceding clause wherein the packets are any of: simple traversal underneath network address translator STUN packets, real-time transport RTP packets, real-time transport control protocol RTCP packets, session initiation protocol SIP packets.

Clause Q. The method of any preceding clause comprising, in response to a specified time elapsing after blocking a flow, unblocking the flow.

Clause R. A user datagram protocol, UDP, firewall comprising:
a processor;
a memory storing instructions that, when executed by the processor, perform a method, comprising:
receiving a flow of packets from a public communications network, the flow of packets being sent into a private communications network;
forwarding only a threshold amount of the flow of packets into the private communications network;
validating the flow of packets in response to receiving a packet in a reverse direction on the same flow;
in response to the validation failing; block the flow of packets;
in response to the validation succeeding allowing the flow of packets to continue to be forwarded into the private communications network.

Clause S. A user datagram protocol, UDP, firewall comprising: a processor;
a memory storing instructions that, when executed by the processor, perform a method, comprising:

receiving a flow of packets from a public communications network, the flow of packets being sent into a private communications network;
for each packet in the flow:
in response to validation of the flow, pass the packet through the UDP firewall into the private communications network;
in response to lack of validation of the flow, check a count of forwarded packets and,
in response to the count being lower than a threshold, incrementing the count and forwarding the packet through the UDP firewall into the private communications network;
in response to the count reaching the threshold, blocking the source of the flow.

Clause T. The UDP firewall of clause S wherein the memory stores instructions such that, for each packet received from the private communications network, in response to a flow of the packet being unvalidated, validating the flow.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method performed by a system implementing a User Datagram Protocol (UDP) firewall comprising:

receiving, by the UDP firewall, a UDP flow of UDP packets from a public communications network, the UDP flow defined by a 5-tuple comprising source IP address, source port, destination IP address, destination port, and UDP transport protocol, the UDP flow of UDP packets being sent into a private communications network;

forwarding, by the UDP firewall, only a threshold amount of UDP packets of the UDP flow of UDP packets into the private communications network;

validating, by the UDP firewall, the flow of UDP packets only in response to receiving a UDP packet in a reverse direction having the same 5-tuple on the same flow;

in response to the validation failing, blocking, by the UDP firewall, the UDP flow of UDP packets; and in response to the validation succeeding, allowing, by the UDP firewall, the UDP flow of UDP packets to continue to be forwarded into the private communications network.

2. The method of claim 1, wherein a lack of any packet being received in the reverse direction on the same flow is taken as validation failing.

3. The method of claim 1, wherein the reverse direction is from the private communications network towards the public communications network.

4. The method of claim 1, wherein the threshold amount is a number of packets received during a length of time taken to establish a voice over internet protocol (VOIP) call between a node in the private communications network of the communications network and a node in the public communications network of the communications network.

5. The method of claim 4, wherein the threshold amount is about one hundred packets.

6. The method of claim 1, wherein the threshold amount is a number of packets expected to be received during a length of time taken to establish a 5th generation (5G) voice over internet protocol (VOIP) call between a node in the private communications network of the communications network and a node in the public communications network of the communications network.

7. The method of claim 1, further comprising forwarding the threshold amount to a node in the private communications network, the node having denial of service defense functionality.

8. The method of claim 1, further comprising dynamically adjusting the threshold according to a number of flows that have been blocked by the firewall.

9. The method of claim 1, further comprising receiving periodic RTCP packets on a flow where media is expected to be unidirectional, the periodic RTCP packets being received from a node in the private communications network.

10. The method of claim 9, wherein the periodic RTCP packets are received at the same RTP port of the firewall as the flow where media is expected to be unidirectional, further comprising receiving the periodic RTCP packets at port N of the firewall and, in response, validating a flow on port N+1 of the firewall.

11. The method of claim 9, further comprising receiving one of the periodic RTCP packets, inspecting a payload of the received RTCP packet and in response to the payload being a specific payload, dropping the received RTCP packet.

12. The method of claim 1, wherein the firewall is stateless.

13. The method of claim 1, further comprising, in response to receiving more than a threshold number of flows in a given time period, triggering instantiation of another firewall.

14. The method of claim 1, further comprising tracking source internet protocol (IP) addresses of flows which have had multiple ports banned and blocking flows from these source IP addresses.

15. The method of claim 1, further comprising, in response to the threshold amount being exceeded within a specified time, blocking the flow.

16. The method of claim 1, wherein the packets are any of: simple traversal underneath network address translator (STUN) packets, real-time transport (RTP) packets, real-time transport control protocol (RTCP) packets, or session initiation protocol (SIP) packets.

17. The method of claim 1, further comprising, in response to a specified time elapsing after blocking a flow, unblocking the flow.

18. A system implementing a user datagram protocol (UDP) firewall comprising:

a processor;

a memory storing instructions that, when executed by the processor, perform operations comprising:

receiving, by the UDP firewall, a UDP flow of UDP packets from a public communications network, the UDP flow defined by a 5-tuple comprising source IP address, source port, destination IP address, destination port, and UDP transport protocol, the UDP flow of UDP packets being sent into a private communications network;

forwarding, by the UDP firewall, only a threshold amount of UDP packets of the UDP flow of UDP packets into the private communications network;

validating, by the UDP firewall, the UDP flow of UDP packets only in response to receiving a UDP packet in a reverse direction having the same 5-tuple on the same flow;

in response to the validation failing; blocking, by the UDP firewall, the UDP flow of UDP packets; and in response to the validation succeeding, allowing, by the UDP firewall, the UDP flow of UDP packets to continue to be forwarded into the private communications network.

19. A computing device implementing user datagram protocol (UDP) firewall comprising:

a processor;

a memory storing instructions that, when executed by the processor, cause the UDP firewall to perform operations comprising:

receiving, by the UDP firewall, a UDP flow of UDP packets from a public communications network, the UDP flow defined by a 5-tuple comprising source IP address, source port, destination IP address, destination port, and UDP transport protocol, the UDP flow of UDP packets being sent into a private communications network;

for each packet in the UDP flow of UDP packets:

in response to validation, by the UDP firewall, of the UDP flow of UDP packets, pass the packet through the UDP firewall into the private communications network;

in response to lack of validation of the UDP flow of UDP packets, check a count of forwarded packets and, in response to the count being lower than a threshold, incrementing the count and forwarding the packet through the UDP firewall into the private communications network; and in response to the count reaching the threshold, blocking a source of the UDP flow of UDP packets.

20. The UDP firewall of claim 19, instructions that, when executed by the processor, perform operations comprising:

for each packet received from the private communications network, in response to a flow of the packet being unvalidated, validating the flow.

* * * * *